(12) United States Patent
Foster

(10) Patent No.: US 7,103,885 B2
(45) Date of Patent: Sep. 5, 2006

(54) COMMENT DRIVEN PROCESSING

(75) Inventor: Tim Foster, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 674 days.

(21) Appl. No.: 09/785,012

(22) Filed: Feb. 16, 2001

(65) Prior Publication Data

US 2002/0078071 A1    Jun. 20, 2002

(51) Int. Cl.
 *G06F 9/45* (2006.01)
(52) U.S. Cl. ...................................... 717/170
(58) Field of Classification Search ................ 717/124, 717/168, 170, 142; 707/203
 See application file for complete search history.

(56) References Cited

U.S. PATENT DOCUMENTS

| | | | | |
|---|---|---|---|---|
| 5,384,894 A | * | 1/1995 | Vassiliadis et al. | 706/52 |
| 5,404,435 A | * | 4/1995 | Rosenbaum | 715/515 |
| 5,414,644 A | * | 5/1995 | Seaman et al. | 702/183 |
| 6,014,517 A | * | 1/2000 | Shagam et al. | 717/142 |
| 6,092,089 A | * | 7/2000 | Lahey et al. | 715/511 |
| 6,266,683 B1 | * | 7/2001 | Yehuda et al. | 715/512 |
| 6,370,549 B1 | * | 4/2002 | Saxton | 707/205 |
| 6,389,434 B1 | * | 5/2002 | Rivette et al. | 715/512 |
| 6,502,233 B1 | * | 12/2002 | Vaidyanathan et al. | 717/101 |
| 2002/0029231 A1 | * | 3/2002 | Aptus et al. | 707/513 |
| 2002/0087526 A1 | * | 7/2002 | Rao | 707/3 |
| 2003/0041056 A1 | * | 2/2003 | Bossemeyer et al. | 707/3 |
| 2003/0121000 A1 | * | 6/2003 | Cooper et al. | 715/513 |
| 2005/0024682 A1 | * | 2/2005 | Hull et al. | 358/1.18 |

FOREIGN PATENT DOCUMENTS

EP     0 840 212 A1    5/1998

* cited by examiner

*Primary Examiner*—John Chavis
(74) *Attorney, Agent, or Firm*—Beyer, Weaver & Thomas LLP

(57) ABSTRACT

A method, system and computer program for processing software modules is provided. Each software module has a version management file associated with it. A version management file includes a comment field for recording at least one tag. Each tag relates to an attribute of the associated software module and has an attribute value. In operation, when an attribute of a software module needs to be known, the comment field of the version management file of the software modules is searched for a predetermined tag. The attribute value that is associated with the predetermined tag is detected when said predetermined tag is found. Processing of the software module is then selectively effected in accordance with the attribute value when said predetermined tag is found, and in accordance with the lack of a predetermined tag when said predetermined tag is not found. The version management file includes history data defining current and prior versions of the software module.

47 Claims, 7 Drawing Sheets

COMMENT DRIVEN PROCESSING

BACKGROUND OF THE INVENTION

The invention relates to a method, apparatus, system and program product for processing software modules.

Processors seeking to perform various different actions on software files need to establish the identity of the software files and the nature of processing needed before processing. With only the files available, a processor must inspect the file's content or the file's name in order to determine how each file should be processed. Otherwise, some external information, such as a checklist of files and attributes (an attribute list) identifying different processes to be performed on each file, is required.

When checklists of files and their attributes are provided, care must be taken when transferring files to also transfer the appropriate checklist and attribute details. Often these can become split up from the file to which they relate, which would make processing difficult.

The present invention aims to provide a method, apparatus, system and program product, which addresses these problems and avoids the requirements for an external attribute list.

SUMMARY OF THE INVENTION

Particular and preferred aspects of the invention are set out in the accompanying independent and dependent claims.

According to one embodiment, the invention provides a method of processing software modules. A version management file is associated with each software module, where the version management file includes a comment field. At least one of the version management files has recorded in its comment field at least one tag. Each tag relates to an attribute of the associated software module and has an attribute value that defines a value of the related attribute. The method includes searching the comment field of the version management file of at least one software module for a predetermined tag. If the predetermined tag is found, the attribute value associated therewith is detected. Then, processing of the software module is selectively effected depending on whether the predetermined tag is found in the comment field of its version management file and, if one is found, on the attribute value associated with that tag. Usually for each of a plurality of software modules, a version management file is provided, and a tag or tags and the associated attribute value(s) are recorded in the comment field of selected software modules. Then, when the attributes of a particular software module or modules are required, a search is carried out. The comment field of the version management file of each of the software module is searched for a predetermined tag. Then, processing of each software module is selectively effected depending on whether the predetermined tag is found in the comment field and, if one is found, on the attribute value associated with that tag.

In another embodiment the method further includes recording in the comment field of the version management file, associated with each software module, one or more tag(s). Each tag relates to an attribute of the software module, and an attribute value associated with each tag defines a value of the related attribute.

Additionally history data defining the current and any previous version(s) of the software module may also be recorded in the version management file. Also, the version management file may be non-executable.

In another embodiment, the invention provides a computer program on a carrier medium for processing software modules. The computer program comprises computer executable instructions for carrying out the steps described above. The computer program can be implemented on a carrier medium, for example, a storage or a transmission medium.

In another embodiment, the invention provides a computer system for processing at least one software module. A version management file is associated with each software module, where the version management file includes a comment field. At least one of said version management file(s) has recorded in its comment field, at least one tag, where each tag relates to an attribute of the software module and has an attribute value that defines a value of the related attribute. The computer system is configured to search the comment field of the version management file of at least one software module for a predetermined tag. If the predetermined tag is found the computer system detects the attribute value associated therewith. Then, processing of a software module is selectively effected depending on whether the predetermined tag is found in the comment field of its version management file and, if one is found, on the attribute value associated with that tag.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described below with reference to the accompanying drawings.

Although particular embodiments of the invention have been described, it will be appreciated that many changes may be made within the spirit and scope of the invention as defined in the appended claims.

Figure 1:
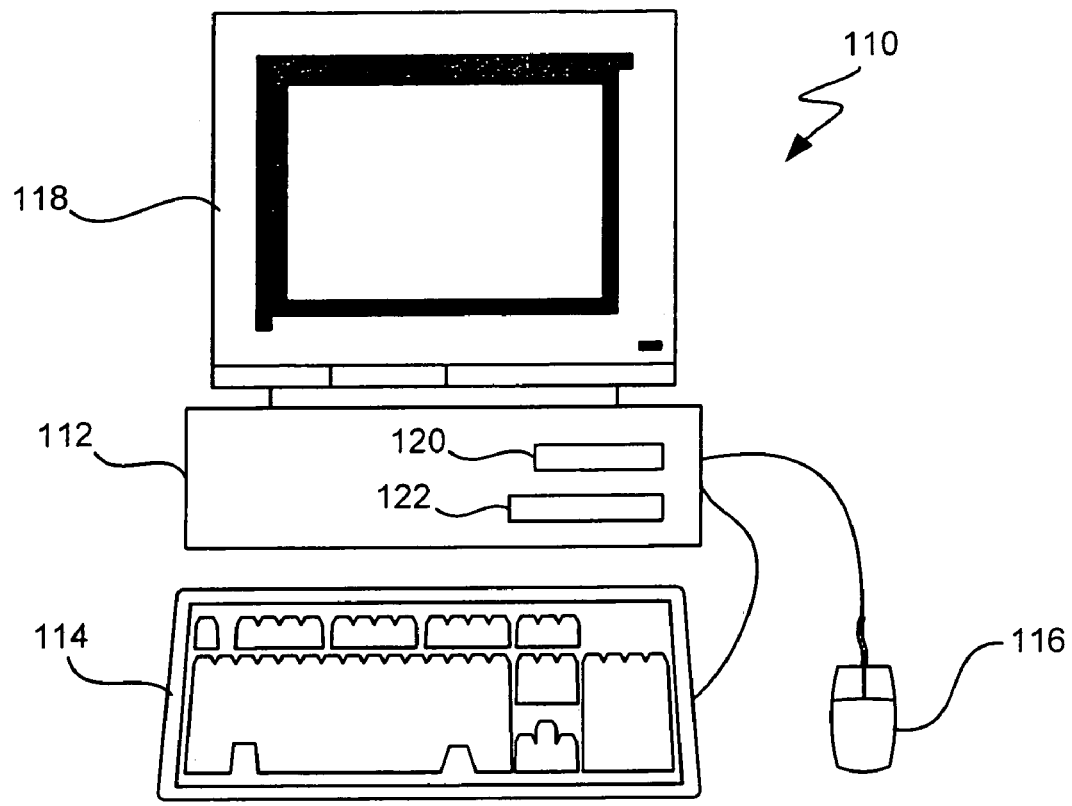
FIG. 1 is a schematic representation of a computer workstation upon which an exemplary embodiment of the invention may be practiced.

FIG. 1 is a schematic representation of a computer workstation on which an exemplary embodiment of the invention may be implemented. As shown in FIG. 1, a computer workstation 110 includes a system unit 112, user input devices, for example in the form of a keyboard 114 and a mouse 116, and a display 118. Removable media devices in the form, for example of a floppy disk drive 120 and an optical and/or magneto-optical drive (e.g. a CD, a DVD ROM, a CDR drive) 122 can also be provided.

Figure 2:
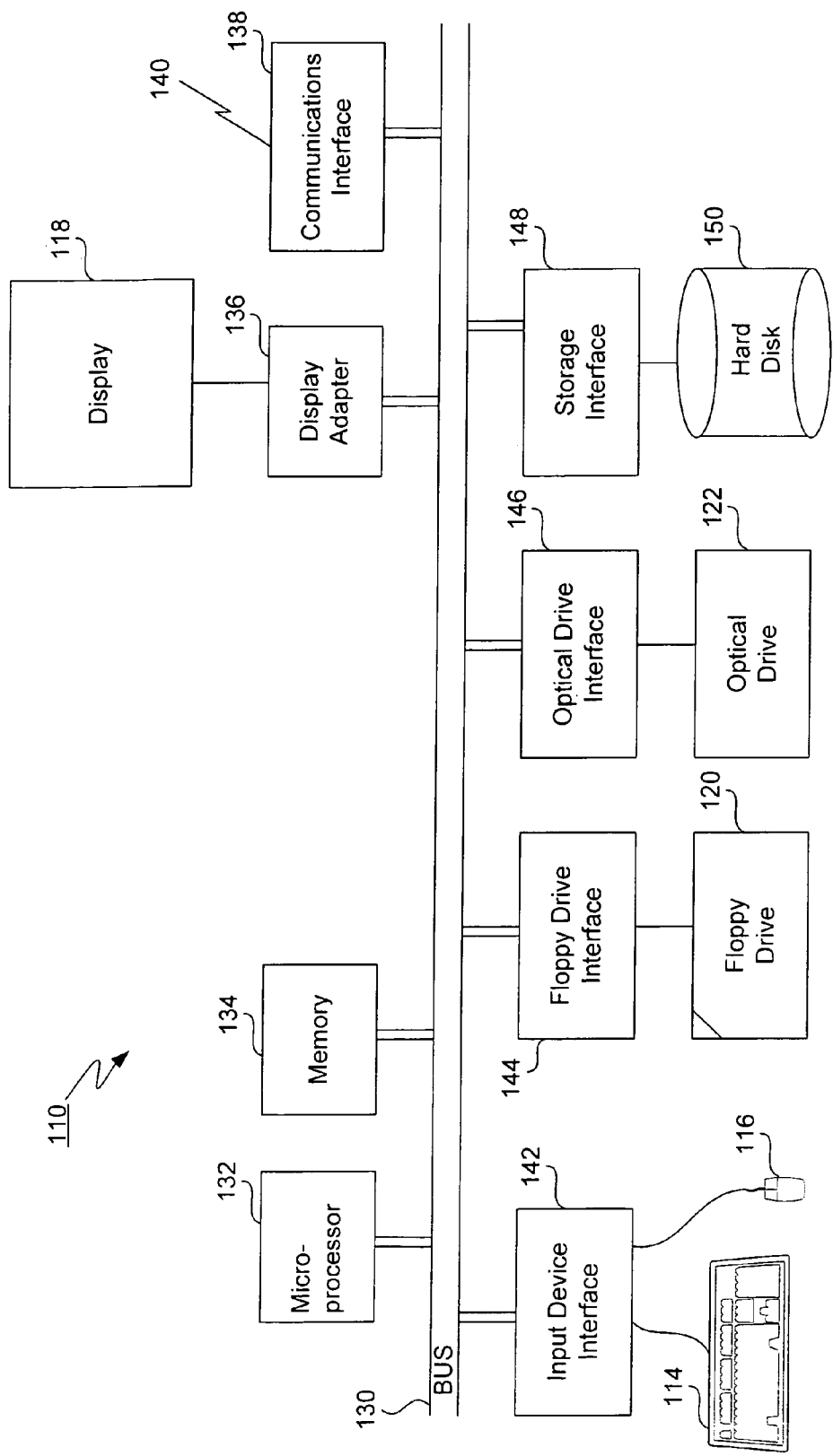
FIG. 2 is a schematic block diagram illustrating more detail including functional components of an exemplary configuration of a computer workstation as shown in FIG. 1.

FIG. 2 is schematic block diagram illustrating an exemplary configuration of a computer workstation 110. As shown in FIG. 2, the system unit 112 includes a bus 130 to which a number of units are connected. A microprocessor (CPU) 132 is connected to the bus 130. Main memory 134 for holding computer programs and data, for example, is also connected to the bus 130 and is accessible to the processor. A display adapter 136 connects the display 118 to the bus 130. A communications interface 138, for example a network interface and/or a telephonic interface such as a modem, ISDN or optical interface, enables the computer workstation 110 to be connected 140 to other computers via, for example, an intranet or the Internet. An input device interface 142 connects one or more input devices, for example the keyboard 114 and the mouse 116, to the bus 130. A floppy drive interface 144 provides access to the floppy disk drive 120. An optical drive interface 146 provides access to the optical or magneto-optical drive 122. A storage interface 148 enables access to a hard disk 150. Further interfaces, not shown, for example for connection of a printer (not shown), may also be provided. Indeed, it will be appreciated that one or more of the components illustrated in FIG. 2 may be omitted and/or additional components may be provided, as required for a particular implementation. Additionally, although aspects of the present invention are described as being stored in memory, one skilled in the art will appreciate that these aspects can also be stored on or read from other types of computer readable media, such as secondary storage devices, like hard disks, floppy disks, or CD-ROM; a carrier wave from a network, such as the Internet; or other forms of RAM or ROM, either currently known or later developed.

Figure 3:
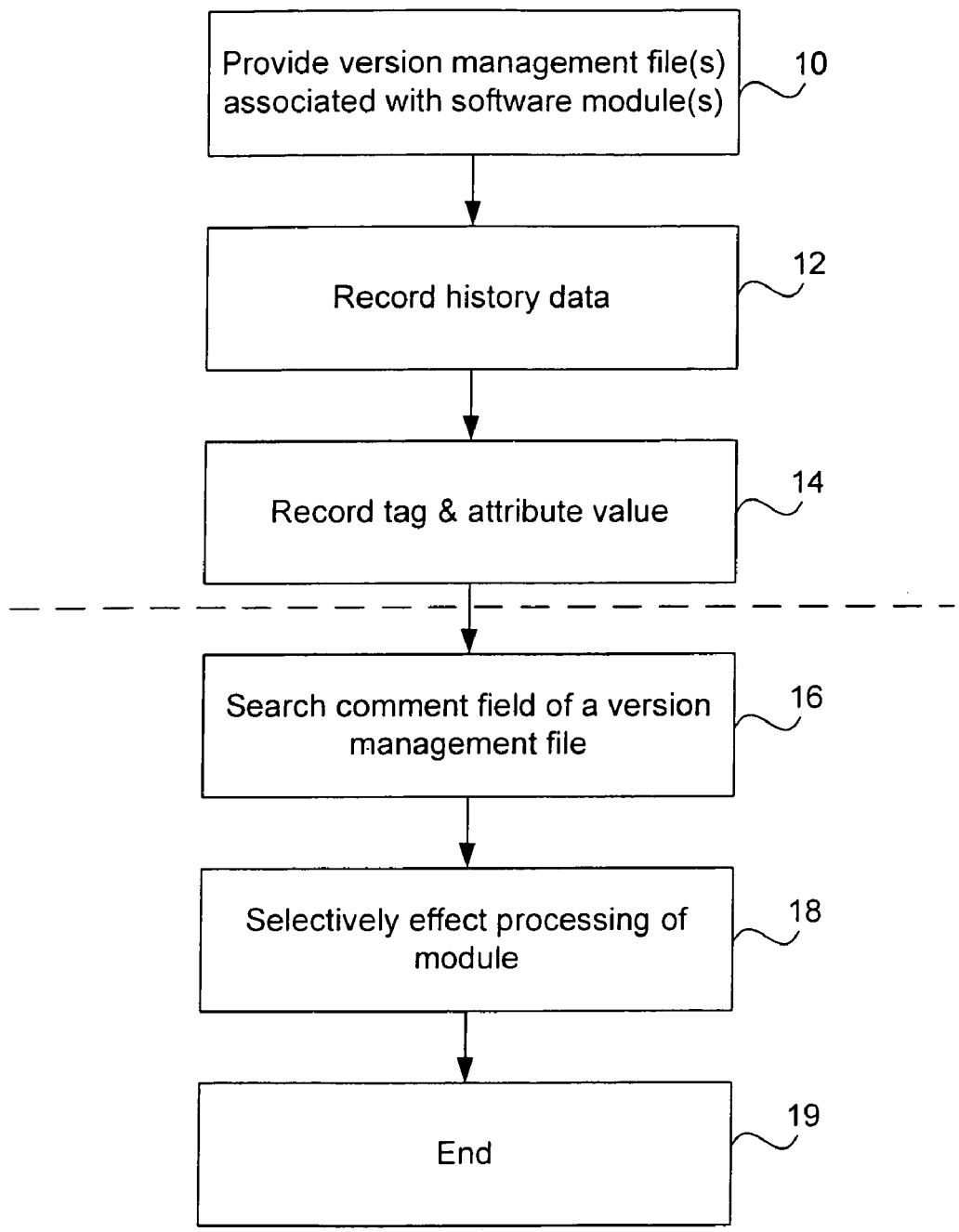
FIG. 3 shows a flow diagram illustrating the method according to an exemplary embodiment of the invention.

FIG. 3 illustrates a method according to an exemplary embodiment of the present invention that includes providing 10 a version management file associated with a software module. In a first exemplary embodiment the software module includes a source code file and the associated version management file holds comments and history data managed by a Source Code Control System (SCCS). In a particular embodiment of the invention, the version management file includes a version number for the software module, a comments field with the comments describing the software module and a history field that includes enough information describing the history of changes in order to be able to reconstruct the software module.

In another implementation of a Source Code Control System (SCCS), separate comment and history files could be provided, although they would still collectively form a version management file, as they would be maintained by the source code control system. Also, although the software module is a source code file in the present example, it could be another file type, for example a graphics file.

The history data written to the version management file defines (at 12) the current version of the source code and the changes that have been made to it in the past. The nature of the history data stored in the version management file will depend on the type of the software module. For example, the history data will relate to changes to source code if the software module contains source code and changes to graphic data if the software module contain graphics.

The history data in the version management file is used to keep track of different versions of the software module during its development. By using a source code management system, a developer is able to, at any time, retrieve any versions of the software module (e.g. the source code) that have been "checked in" throughout the life of the software module. It allows different developers to work on the same version of the file, and include any comments they may have in the version management file.

Thus, the recording of the changes is used, when code is available to multiple users, to keep track of the differences between files and to avoid conflicts. To use a file under SCCS, a user checks out the file, so that the processor is aware of which user is accessing that file, makes the required changes (e.g. debugging), and checks it back in, often adding some specific comment to indicate what that user did to the file while it was checked out to him/her, (e.g. "debugged").

Next, one or more attributes of a software module, represented by the presence or not of an attribute tag and an associated value, may be recorded 14 in the comment field of the version management file.

Then, an inspection 16 of the comment field of each version management file can be used to determine the manner in which each software module should be processed. For example the software module may be a data file and one attribute of a data file may be whether or not the data file may be translated. Then, as will be explained below, the presence or lack thereof of a given tag and any associated attribute value will be used to identify the translation attribute of the data file.

The software module, is then processed 18 depending on whether a predetermined tag is found in the comment field of its version management file and, if one is found, on the attribute value associated with that tag. So once tag information has been included in the comment field of the version management file, which in one example may be the SCCS comment field of the version management file corresponding to a given source code file, a user can determine the attributes of the software module, or source code file, simply by searching the information in that comment field. This avoids the requirement for a separate attribute list, or for the user to inspect the file name and/or its contents.

Another advantage is that because SCCS comment histories accompany their source code files at all times in the development process, the transfer of the source code file, and the data defining its attributes, is made very simple. That is, as the comment fields in the version management file for a given software module contains the attribute data as specially tagged comments, the attributes will always accompany the software module. Normal comments can co-exist with these attributes in the comments field of the version management file.

If, instead of the approach in accordance with the invention, an external list of attributes, that is, a separate list of filenames and their associated attribute values, were used, this would provide one more thing that can get lost during development, as the list would need to be transferred when a file was transferred. Problems can arise through only the file being transferred, without the external list. This is avoided by using the comment field of a version management file in accordance with the invention. Also, it is possible to provide an unlimited attribute list without touching the file code, and so there is no need to recompile the file when the attribute list is altered. The execution of the algorithm terminates at 19.

Figure 4A:
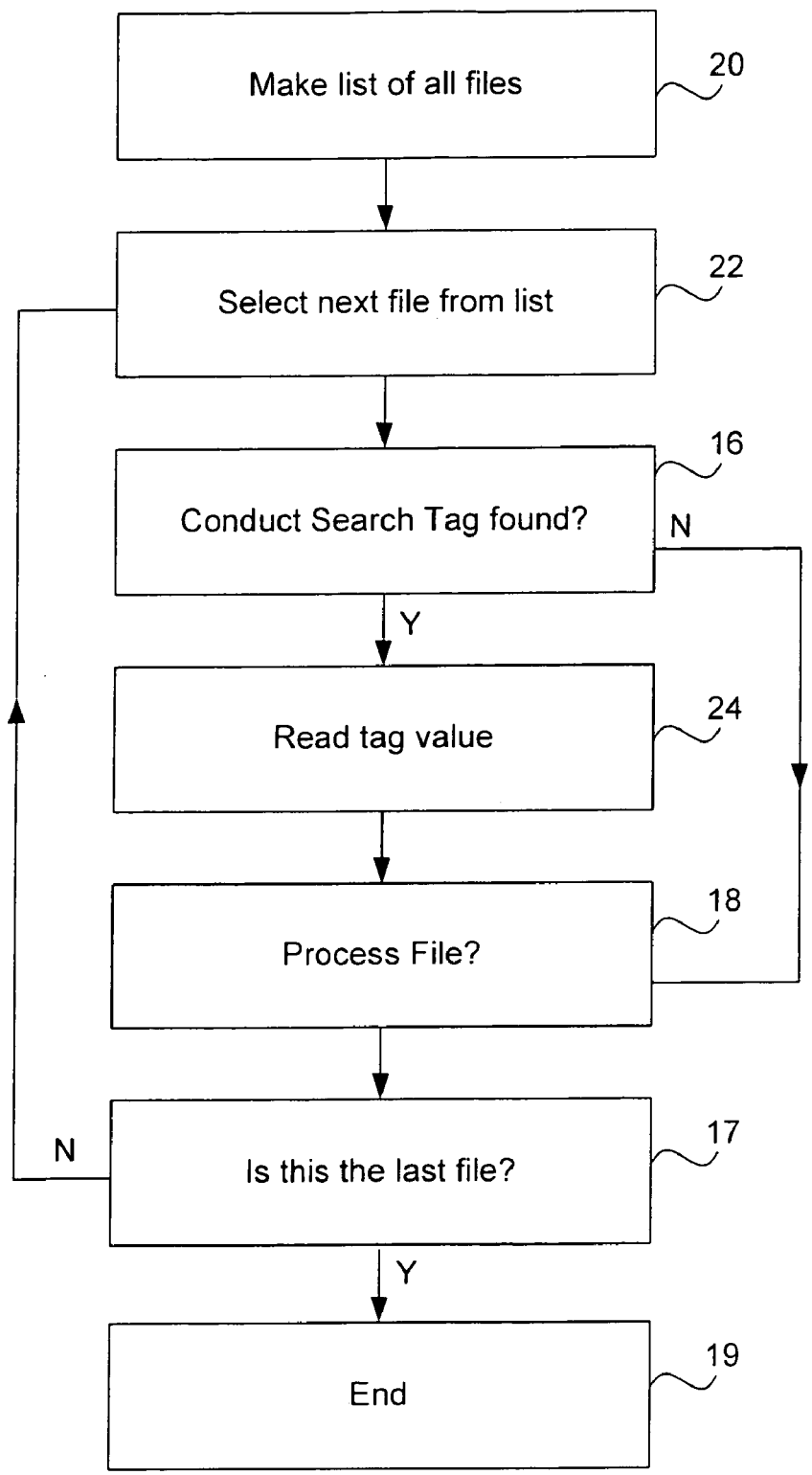
FIGS. 4A and 4B show flow diagrams illustrating, in more detail, a section of the exemplary method shown in FIG. 3.

FIG. 4A is a flow diagram illustrating an example of a control program according to an embodiment of the invention. Referring to FIG. 4A, a method for searching for a particular file attribute may comprise, making a list 20 of all software modules or source code files 62 (See FIG. 6) in the relevant workspace, then, working through the source code files 62 listed, selecting 22 a software module or source code file 62 from the list and searching through the comment field of its version management file 64 (See FIG. 6) for the tag associated with the particular attribute 16. If the tag is found then the associated attribute value is read 24. For example it may indicate that the file may be translated. If no tag is found then the file 62 is processed depending on a predefined default condition. For example, this could be that in the absence of a tag, no translation is effected. In either case, the source code file is processed 18 depending on whether or not the tag was found and, if so, on the attribute value associated with the tag. A check may be made 17 to see whether there are more files in the list that have not yet been searched. If there are more files, then these steps may be repeated for the next source code file in the file list until all the source code files 62 have been processed. The execution of the algorithm terminates at 19.

Figure 4B:
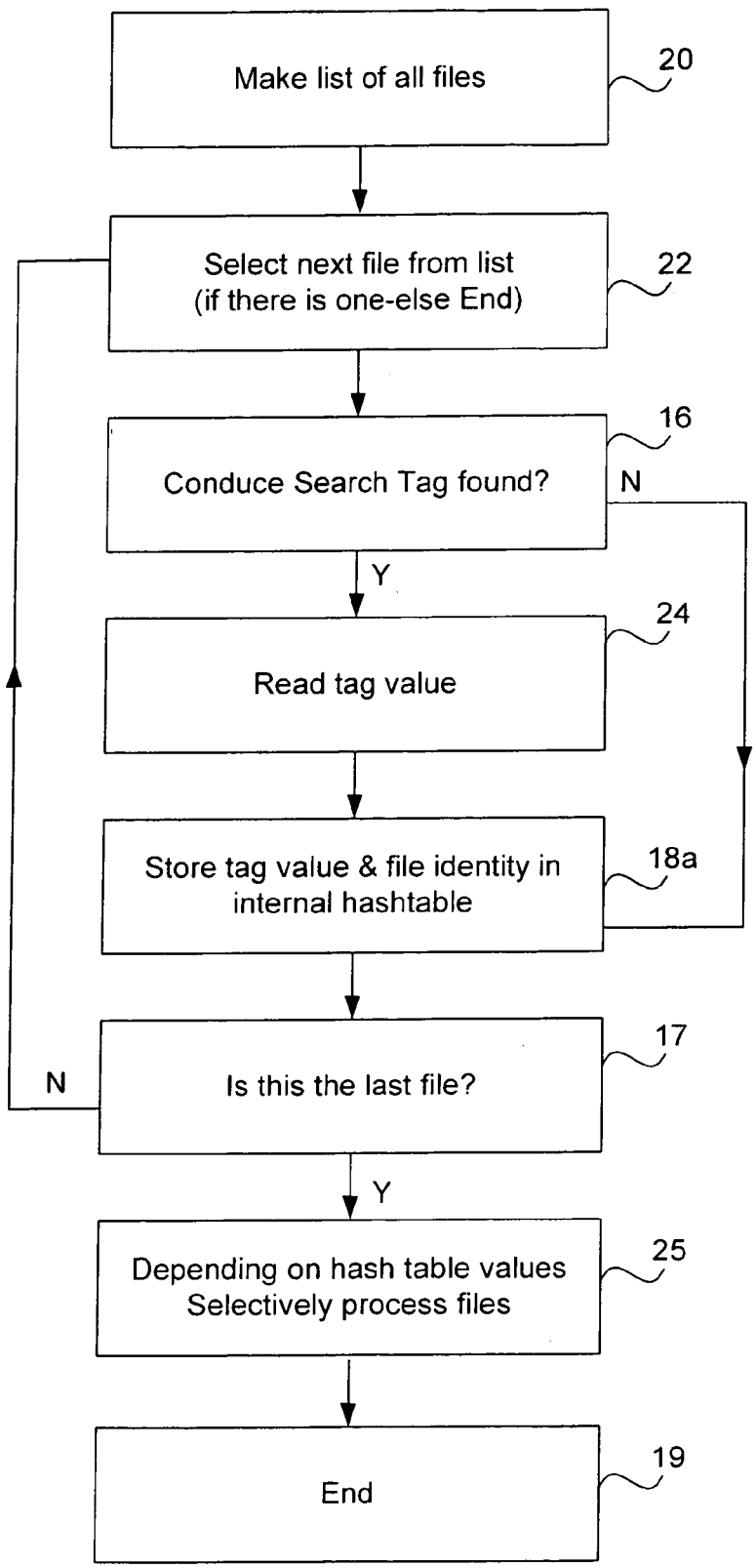

In an alternative process, shown in FIG. 4B, the control program can be configured to search 16 all of the software modules or source code files 62 in the file list for a predetermined tag and the value of any tags found read 24 in similar manner to that described above (steps 20, 22, 16 and 24 would be similar), and then all the source code files could be processed after the search step has been carried out with respect to all the files in the list. So, instead of selectively processing each source code file 62 after checking its version management file for tags, once a source code file's version management file has been checked for a tag and the value of any tag found has been read and stored, the system moves on to the next software module or source code file 62 and conducts a tag search with respect to that module or file. The system stores 18a, in a two-dimensional array or hash table, an entry for each software module or source code file identifying any tags found in the comment field of the respective version management file and the attribute value associated with each tag found. When all the source code files 62 in the list have been checked, (tested in step 17), the source code files 62 are selectively processed 25, each depending on whether a tag was found in its version management file and, if so, on the attribute value associated therewith, using the data stored in the twodimensional array. The execution of the algorithm terminates at 19.

Alternatively, the control program could be configured to carry out the searching and processing steps in batches of software modules or source code files, for example a batch of ten source code files may first all be searched for tags and then all be selectively processed, before the next batch of files in the file list is dealt with.

As will be apparent from the above description, there could be several versions of a software module during its life cycle that are recorded in the version management file. Each of these versions could have a comment attached to it. In the case of a translatable file, each subsequent version could introduce new messages for translation. It may be desired to locate a most recent version of a software module. For example, if attributes are stored to indicate an amount of words to translate in a translatable file, it can be desired to pick the most recent attribute (since all the older ones will be out of date). Accordingly, the searching steps can be performed so as to identify the most recent record having the desired tagged attribute.

Figure 5:
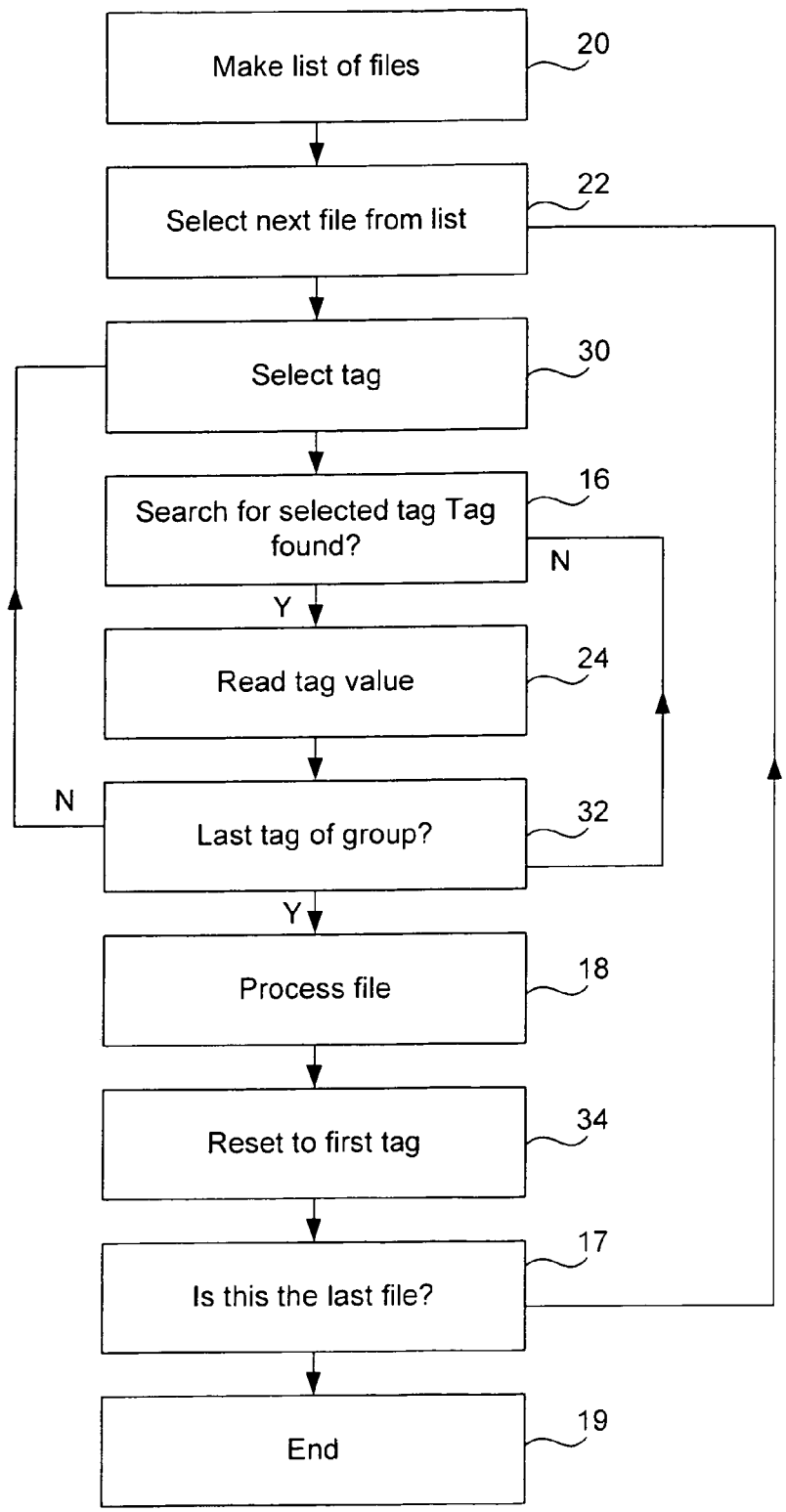
FIG. 5 shows a modification to the method illustrated in FIG. 4.

FIG. 5 shows a modified control program to the above-described method that can accommodate more than one particular software module attribute, i.e. more than one type of tag. After a list of source code files has been made 20, a software module or source code file is selected 22 from the list. Then a first tag is selected 30 from the group of different tags of interest. The comment field of the version management file of the software module or source code file selected in step 22 is then searched in step 16 for the selected tag and if the tag is found, the tag value read 24, as described above.

If a tag is not found, a check is then made to see whether the tag for which a search has been made is the last tag of the group (or the only tag) 32. If there are other tags of interest which have not yet been searched for, the method returns to step 30, and after another tag is selected 30, the comment field of the version management file is searched for the next tag of the group 16. (Alternatively, during the search step 16 a search for more than one type of tag could be conducted simultaneously). When the version management file of a source code file has been searched for the last tag of the group 32 the source code file is then selectively processed 18 depending on whether any tags of the group were found with respect to that file and, if so, on the attribute value associated with each tag found. The first tag of the group is then reselected 34, and the next source code file in the list is selected 22. The process is repeated for each of the files in the file list at 17. The execution of the algorithm terminates at 19.

In a further embodiment, the step 20 of making a list of source code files may include the step of checking whether a list of the files in the workspace or locale of interest already exists. If the list does exist then a message is displayed to the user, for example "the file list for $LC already exists—I'm going to use the current one", where $LC is a variable name, for example, denoting the locale center. Otherwise a new list may be generated.

Using SCCS, for example, the search step 16 may include using a set of UNIX commands which can write their output to a stream. The command sccs prt <filename> will list the whole history of the file <filename>. The command grep searches for a piece of text containing a certain keyword or tag. The command head –1 can be used to select the topmost output line, that is the most recent comment containing the keyword or tag being searched for. Combining these commands as shown below allows a search for the most recent tag in the comment field to be found where '#TMC#' is one example of a tag which may be searched for:

'sccs prt <filename>|grep #TMC#|head–1'

The particular form of tag used could be changed to something other than #TMC# as long as the alternative chosen is a string that is not found in normal text and can, therefore, be recognized as a tag.

An example of an application of the method and system of this embodiment is the translation of documents, when all the documents to be translated are stored under a source code control system. In this example, a specially denoted comment in the comment field of a version management file may be used as a tag to determine whether the document file should be translated or not.

A tag relating to the translation attribute of the file, for example #TMC#, may be used. A list of possible attribute values is TRANSLATE, NOTRANS, and NEVERTRANS. In this example, if no #TMC# tag is included in a file, this indicates that the file should be translated, and the processor performs a software translation on the file content. If a #TMC# tag with a NOTRANS value is found the processor knows not to translate the file content. If a #TMC# tag is found with the value TRANSLATE, the processor translates the file content. This tag value is used when a file has previously been given a NOTRANS tag and a user wishes to reverse this indication. If a #TMC# tag with the value NEVERTRANS is found then the processor will not translate the file content.

After a file containing a list of the files in the relevant workspace that have SCCS information, for example called $LC.filelist.txt, has been created 20, a search may be conducted, for each file, for the most recent comment in the comment field which includes a #TMC# tag, for example. The processor then processes the content of each file depending on whether a #TMC# tag is found. If the tag is not found, then the file content will be translated. If a #TMC# tag is found the processor then checks the value associated with that tag and then processes the file in accordance with the value.

It is possible to search the entire version management file for tags to find those which were placed in the comment field before the most recent #TMC# tag, for example to see whether a comment field includes a tag with the value NEVERTRANS. To do this first a listing of all the #TMC# tags in the comment field is made:

```
$SCCS prt $FILE | grep "#TMC#" > /tmp/temp.file
Then an empty variable is set up:
    TMC-NEVERTRANS-FOUND=""
Next search all the #TMC# tags in the list:
    for tag in 'cat /tmp/temp.file'
    do
        TMC-NEVERTRANS-FOUND = 'echo $tag | grep
                                    "#TMC#NEVERTRANS"'
    done
```

Then a selection of the most recent #TMC# tag is found as usual. Finally a check is made to see whether the value of the TMC-NEVERTRANS-FOUND variable is non-zero, that is whether the search found a NEVERTRANS flag. If it did then the #TMC# tag value in the comment field can be reset to "NEVERTRANS", possibly by overwriting the most recent occurrence of a #TMC# tag.

In another feature of this embodiment, the files may include an identification of the number of words in the file. A file can be checked out, passed through a word count utility, and checked back in with an amendment to the comment field. This amendment could be the insertion of a 'word count' tag and an associated value representing the number of words in the document. The comment field preferably has a machine-readable bit or bits, which can contain the word count of the file. This can then be used by a software translation module, if necessary.

For example, the word count could be used to determine the translation attribute to be given to that file, that is whether or not a #TMC# tag should be inserted and, if so, the value to be given to it. For example, a user may have decided only to translate files having a word count less than 5,000 words. So, for a file with a word count of more than 5,000 words a #TMC# tag may be included with an attribute value "NOTRANS" so that it is not translated during processing.

The results of the search for a tag or tags and its (their) associated value may result in the display of a message to the user, for example "This file is translatable and contains 106 words".

In another embodiment, a computer system for processing software modules may be implemented on the computer workstation 110 of FIGS. 1 and 2. In such a system, each software module has an associated version management file including a comment field, where the computer system may be configured to record, in the comment field of a version management file, a tag relating to an attribute of the associated software module, and an attribute value associated with said tag defining a value of the related attribute. The computer system may also be configured to search the comment field of the version management file of one or more of the software module(s) for a predetermined tag and, if one is found detect the attribute value associated therewith. Then, the computer system may selectively effect processing of a software module depending on whether the predetermined tag is found in the comment field of its version management file and, if one is found, on the attribute value associated with that tag. The computer system may further be configured to record, in a version management file, history data defining the current and any previous version(s) of the associated software module.

Software modules can be provided in the random access memory (RAM). Comments to be placed in the comment field of a file may be input via the keyboard 114 or mouse 116, or by any suitable input device. The CPU will pull a selected file from RAM, into a memory buffer then make the input changes and then restore the file in RAM. If the CPU detects from the results of the search that processing of the file is required, for example that the file should be translated, the CPU carries out the next stage of processing of the file, for example forwards it to a translation utility.

A computer program for implementing the method and system described above may be supplied on media such as one or more CD-ROMs and/or floppy disks and then stored on a hard disk, for example. A program implementable by a computer system may also be supplied on a telecommunications medium, for example over a telecommunications network and/or the Internet. For a computer system operating as a mobile terminal over a radio telephone network, the telecommunications medium may be a radio frequency carrier wave carrying suitably encoded signals representing the computer program and data or information. Optionally, the carrier wave may be an optical carrier wave for an optical fiber link or any other suitable carrier medium for a land line link telecommunication system.

Figure 6:
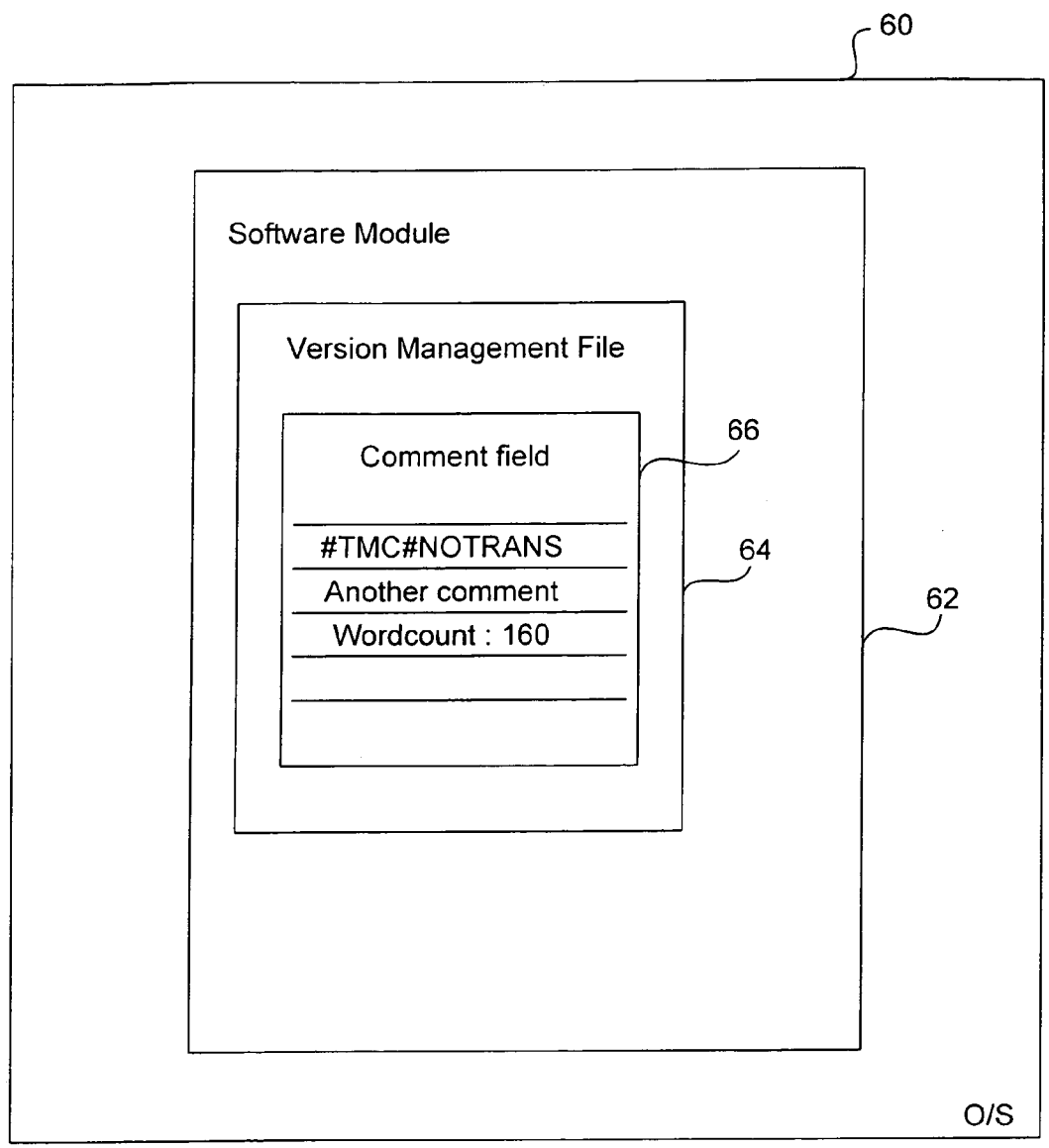
FIG. 6 shows an exemplary file structure of a software module in accordance with the invention.

FIG. 6 is a schematic representation of a software hierarchy of an exemplary embodiment of the present invention. The software hierarchy illustrates the operating system (OS) 60 of the computer workstation 110. A software module 62 includes a version management file 64 which has a comment field 66. The comment field includes history data defining the current and any previous version(s) of the software module, as well as any tags and associated attribute values that have been recorded therein. In FIG. 6, the comment field includes a #TMC# tag, which has an associated attribute value 'NOTRANS'. Another type of tag, a 'word count' tag is also included, with an associated attribute value of '160'.

Although particular embodiments of the invention have been described, those skilled in the art will know of various changes in form and detail which may be made without departing from the spirit and scope of the present invention as defined in the appended claims and their full scope of equivalents.

In particular, while the exemplary embodiment has been described in relation to the SC. comment mechanism, any version management file system or source code management system with a comment mechanism may be used, for example RCS (Revision Control System), CVS (Linux) or Clearcase (Windows).

The invention claimed is:

1. In a source code control system, a method of processing software modules, each of the software modules having a version management file associated therewith, where at least one version management file includes a comment field for recording at least one tag, where each tag relates to an attribute of the associated software module and has an attribute value, the method comprising:
   searching the comment field of the version management file of at least one of the software modules for a predetermined tag;
   detecting the attribute value associated with the predetermined tag when said predetermined tag is found; and
   selectively effecting processing of the at least one of the software modules in accordance with the attribute value when said predetermined tag is found, and in accordance with the lack of a predetermined tag when said predetermined tag is not found.

2. The method of claim 1, further comprising recording, in said version management file, history data defining current and prior versions of the at least one of the software modules.

3. The method of claim 1, wherein searching the comment field comprises searching for a most recent version of the version management file that includes the predetermined tag.

4. The method of claim 1, further comprising recording in said comment field one or more of a plurality of different tags, each relating to a different attribute of the associated software module.

5. The method of claim 1, further comprising searching the comment field of the version management file of one or more of the software modules for two or more different, predetermined tags.

6. The method of claim 5, further comprising selectively effecting processing of the one or more of the software modules depending on whether any of the two or more tags are found in the comment field of its version management file, the processing depending on the nature of each of the tags and associated attribute values when said tags are found.

7. The method of claim 1, further comprising searching the comment field of each of a plurality of version management files, each associated with one of the software modules, for the predetermined tag.

8. The method of claim 1, wherein searching the comment field comprises making a list of all files and then selecting successive files from the list for inspection.

9. The method of claim 8, wherein the selective processing of the at least one of the software modules comprises storing information about the at least one of the software modules in a hash table during the searching and subsequently processing the at least one of the software modules.

10. The method of claim 1, wherein a search is performed for a plurality of predetermined tags.

11. The method of claim 10, further comprising:
a) generating a list of the software modules;
b) selecting one of the software modules from the list;
c) selecting one of the predetermined tags;
d) searching the comment field of the version management file for the selected one of the software modules for the selected one of the predetermined tags;
e) where the selected one of the predetermined tags is found, reading the attribute value;
f) repeating steps (c) to (e) with a different one of the predetermined tags being selected until all of the predetermined tags have been selected; and
g) repeating steps (b) to (f) with a different one of the software modules from the list being selected until all of the software modules from the list have been selected.

12. A computer program on a carrier medium, the computer program comprising computer executable instructions for processing software modules in a source code control system, wherein each of the software modules has a version management file associated therewith, where at least one version management file includes a comment field for recording at least one tag, where each tag relates to an attribute of the associated software module and has an attribute value, the computer executable instructions being operable to:
search the comment field of the version management file of at least one of the software modules for a predetermined tag;
detect the attribute value associated with the predetermined tag when said predetermined tag is found; and
selectively effect processing of the at least one of the software modules in accordance with the attribute value when said predetermined tag is found, and in accordance with the lack of a predetermined tag when said predetermined tag is not found.

13. The computer program of claim 12, wherein the computer executable instructions are further operable to record, in the version management file, history data defining current and previous versions of the at least one of the software modules.

14. The computer program of claim 12, wherein the computer executable instructions, operable to search, search for a most recent version of a version management file that includes the predetermined tag.

15. The computer program of claim 12, wherein the computer executable instructions are operable to record in said comment field one or more of a plurality of different tags, each relating to a different attribute of the associated software module.

16. The computer program of claim 12, wherein the computer executable instructions are operable to search the comment field of the version management file of one or more of the software modules for two or more different, predetermined tags.

17. The computer program of claim 16, wherein the computer executable instructions are operable selectively to effect processing of the one or more of the software modules depending on whether any of the two or more tags are found in the comment field of its version management file, the processing depending on the nature of each of the tags and associated attribute values when said tags are found.

18. The computer program of claim 12, wherein the computer executable instructions are operable to search the comment field of each of a plurality of version management files, each associated with one of the software modules, for the predetermined tag.

19. The computer program of claim 12, wherein the computer executable instructions operable to search the comment field, makes a list of all files and then selects successive files from the list for inspection.

20. The computer program of claim 19, wherein the computer executable instructions are operable to selectively process the at least one of the software modules further store information about the at least one of the software modules in a hash table during the search and subsequently process the at least one of the software modules.

21. The computer program of claim 12, wherein the computer executable instructions are operable to search for a plurality of predetermined tags.

22. The computer program of claim 21, wherein the computer executable instructions are operable:
a) to generate a list of the software modules;
b) to select one of the software modules from the list;
c) to select one of the predetermined tags;
d) to search the comment field of the version management file for the selected one of the software modules for the selected one of the predetermined tags;
e) where the selected one of the predetermined tags is found, to read the attribute value;
f) to repeat steps (c) to (e) with a different one of the predetermined tags being selected until all of the predetermined tags have been selected; and
g) to repeat steps (b) to (f) with a different one of the software modules from the list being selected until all of the software modules from the list have been selected.

23. A computer system for processing software modules in a source code control system, each of the software modules having a version management file associated therewith, where at least one version management file includes a comment field for recording at least one tag, where each tag relates to an attribute of the associated software module and has an attribute value, the computer system being configured to:
  search the comment field of the version management file of at least one of the software modules for a predetermined tag;
  detect the attribute value associated with the predetermined tag when said predetermined tag is found; and
  selectively effect processing of the at least one of the software modules in accordance with the attribute value when said predetermined tag is found, and in accordance with the lack of a predetermined tag when said predetermined tag is not found.

24. The computer system of claim 23, further configured to record, in said version management file, history data defining current and prior versions of the at least one of the software modules.

25. A computer system for processing software modules in a source code control system, each of the software modules having a version management file associated therewith, where at least one version management file includes a comment field for recording at least one tag, where each tag relates to an attribute of the associated software module and has an attribute value, the system comprising:
  a) a memory for storing software; and
  b) a processing unit for executing the software to carry out the steps of:
    i) searching the comment field of the version management file of at least one of the software modules for a predetermined tag;
    ii) detecting the attribute value associated with the predetermined tag when said predetermined tag is found; and
    iii) selectively effecting processing of the at least one of the software modules in accordance with the attribute value when said predetermined tag is found, and in accordance with the lack of a predetermined tag when said predetermined tag is not found.

26. A software module and an associated version management file on a carrier medium, said version management file comprising a comment field for recording at least one tag, where each tag relates to an attribute of the associated software module and has an attribute value and history data defining current and prior versions of the software module, wherein the comment field includes a translation tag indicating whether the associated software module is to be translated.

27. The method as recited in claim 1, wherein at least one of the software modules is a source code file.

28. The method as recited in claim 1, wherein at least one of the software modules includes computer readable instructions.

29. The method as recited in claim 1, wherein at least one of the software modules is a data file.

30. The method as recited in claim 29, wherein selectively effecting processing comprises:
  translating the data file in accordance with the attribute value.

31. The method as recited in claim 1, wherein said predetermined tag is an attribute tag, wherein selectively effectively processing comprises:
  translating the at least one of the software modules in accordance with the attribute value when said predetermined tag is found, and in accordance with the lack of a predetermined tag when said predetermined tag is not found.

32. The method as recited in claim 31, wherein the attribute is a translation attribute indicating whether translation of the corresponding one of the software modules is to be performed.

33. The method as recited in claim 32, wherein the attribute value indicates that the corresponding one of the software modules is to be translated, not translated, or never translated.

34. The method as recited in claim 31, wherein when said predetermined tag is not found, the at least one of the software modules is translated.

35. The method as recited in claim 31, wherein the software modules are stored under the source code control system.

36. The method as recited in claim 1, wherein the predetermined tag is a word count tag, the attribute value of the word count tag indicating a number of words in the corresponding one of the software modules.

37. The method as recited in claim 36, further comprising:
  modifying the attribute value of the word count tag when the corresponding one of the software modules is checked into the source code control system.

38. The method as recited in claim 31, wherein the at least one tag further includes a word count tag, the attribute value of the word count tag indicating a number of words in the corresponding one of the software modules.

39. The method as recited in claim 38, further comprising:
  determining from the attribute value of the word count tag of the comment field of the version management file of at least one of the software modules the attribute value to assign to the attribute tag.

40. The method as recited in claim 38, further comprising:
  determining from the attribute value of the word count tag of the comment field of the version management file of at least one of the software modules whether to insert the translation tag into the comment field of the version management file.

41. The method as recited in claim 38, further comprising:
  modifying the attribute value of the word count tag when the corresponding one of the software modules is checked into the source code control system.

42. The method as recited in claim 1, wherein the at least one tag includes a word count tag, the attribute value of the word count tag indicating a number of words in the corresponding one of the software modules.

43. The method as recited in claim 42, further comprising:
  modifying the attribute value of the word count tag when the corresponding one of the software modules is checked into the source code control system.

44. The method as recited in claim 43, further comprising:
  determining from the attribute value of the word count tag of the comment field of the version management file of at least one of the software modules whether to insert a translation tag into the comment field of the version management file.

45. The method as recited in claim 42, further comprising:
  determining from the attribute value of the word count tag of the comment field of the version management file of at least one of the software modules whether to insert a translation tag into the comment field of the version management file.

46. The method as recited in claim 45, further comprising:
  determining from the attribute value of the word count tag the attribute value to assign to the attribute tag of the comment field of the version management file of one of the software modules when the attribute tag of the software module is inserted into the comment field of the version management file.

47. The method as recited in claim 1, wherein the software modules are stored under the source code control system.

* * * * *

UNITED STATES PATENT AND TRADEMARK OFFICE
CERTIFICATE OF CORRECTION

| | | |
|---|---|---|
| PATENT NO. | : 7,103,885 B2 | |
| APPLICATION NO. | : 09/785012 | |
| DATED | : September 5, 2006 | |
| INVENTOR(S) | : Tim Foster | |

It is certified that error appears in the above-identified patent and that said Letters Patent is hereby corrected as shown below:

On the cover page, in column 1, please insert the foreign priority --This application claims priority to European Patent Application No. 306017.5, filed July 14, 2000--.

In column 1, at line 5, please insert the following paragraph of priority --This application claims priority to European Patent Application No. 306017.5, filed July 14, 2000; the disclosure of which is hereby incorporated herein in its entirety.--.

Signed and Sealed this

Twenty-third Day of January, 2007

JON W. DUDAS
*Director of the United States Patent and Trademark Office*